(12) United States Patent
Prasittisopin et al.

(10) Patent No.: US 10,934,214 B2
(45) Date of Patent: Mar. 2, 2021

(54) BINDING MATERIAL SUITABLE FOR THREE-DIMENSIONAL PRINTING FORMATION

(71) Applicant: SCG Cement Company Limited, Bangkok (TH)

(72) Inventors: Lapyote Prasittisopin, Muang Phrae (TH); Kittisak Pongpaisarnseree, Bangkok (TH); Patiphat Jiramarootapong, Nonthaburi (TH); Chalermwut Snguanyat, Bangkok (TH)

(73) Assignee: SCG Cement Company Limited, Bangkok (TH)

( * ) Notice: Subject to any disclaimer, the term of this patent is extended or adjusted under 35 U.S.C. 154(b) by 0 days.

(21) Appl. No.: 16/519,876

(22) Filed: Jul. 23, 2019

(65) Prior Publication Data
US 2020/0299193 A1 Sep. 24, 2020

(30) Foreign Application Priority Data
Mar. 19, 2019 (TH) ................. 1901001622

(51) Int. Cl.
| | |
|---|---|
| *C04B 28/06* | (2006.01) |
| *C04B 14/28* | (2006.01) |
| *C04B 14/06* | (2006.01) |
| *C04B 22/12* | (2006.01) |
| *C04B 24/10* | (2006.01) |
| *C04B 24/38* | (2006.01) |
| *C04B 24/12* | (2006.01) |
| *C04B 24/04* | (2006.01) |
| *C04B 14/10* | (2006.01) |
| *C04B 24/26* | (2006.01) |
| *C04B 24/28* | (2006.01) |
| *C04B 16/06* | (2006.01) |
| *C04B 14/48* | (2006.01) |
| *C04B 28/04* | (2006.01) |
| *C04B 111/00* | (2006.01) |
| *C04B 103/20* | (2006.01) |
| *C04B 103/44* | (2006.01) |

(52) U.S. Cl.
CPC ............ *C04B 28/065* (2013.01); *C04B 14/06* (2013.01); *C04B 14/10* (2013.01); *C04B 14/28* (2013.01); *C04B 14/48* (2013.01); *C04B 16/06* (2013.01); *C04B 22/126* (2013.01); *C04B 24/04* (2013.01); *C04B 24/10* (2013.01); *C04B 24/128* (2013.01); *C04B 24/2623* (2013.01); *C04B 24/2641* (2013.01); *C04B 24/281* (2013.01); *C04B 24/383* (2013.01); *C04B 28/04* (2013.01); *C04B 28/06* (2013.01); *C04B 2103/20* (2013.01); *C04B 2103/44* (2013.01); *C04B 2111/00181* (2013.01)

(58) Field of Classification Search
CPC ......... C04B 7/323; C04B 14/06; C04B 14/10; C04B 14/28; C04B 14/48; C04B 16/06; C04B 22/008; C04B 22/064; C04B 22/126; C04B 24/04; C04B 24/10; C04B 24/128; C04B 24/281; C04B 24/383; C04B 24/2623; C04B 24/2641; C04B 28/02; C04B 28/04; C04B 28/06; C04B 28/065; C04B 2103/0057; C04B 2103/0079; C04B 2103/20; C04B 2103/44; C04B 2111/00181; B33Y 70/00
See application file for complete search history.

(56) References Cited

U.S. PATENT DOCUMENTS

2019/0071355 A1\* 3/2019 Inkaya ................ C04B 7/04

FOREIGN PATENT DOCUMENTS

| CN | 104891891 A | \* | 9/2015 |
| CN | 106639025 A | \* | 5/2017 |
| CN | 107500687 A | \* | 12/2017 |
| WO | WO-2017221058 A1 | \* | 12/2017 |

\* cited by examiner

*Primary Examiner* — Anthony J Green
(74) *Attorney, Agent, or Firm* — Troutman Pepper Hamilton Sanders LLP

(57) ABSTRACT

A cementitious composition suitable for formation by three-dimensional printing according to the present invention is aimed at developing a cementitious composition suitable for formation by three-dimensional printing which gives good stability to the extruded material coming out of a nozzle. The workpiece obtained from the three-dimensional printing formation therefore has fewer errors and greater fineness and is easier to use. The cementitious composition comprises cement, fine aggregate, powdered limestone, expanding admixture, retarding admixture, thickener and rheology modifier.

12 Claims, 1 Drawing Sheet

BINDING MATERIAL SUITABLE FOR THREE-DIMENSIONAL PRINTING FORMATION

CROSS-REFERENCE TO RELATED APPLICATIONS

This application claims priority to Thailand Patent Application serial no. 1901001622 filed Mar. 19, 2019. The contents of this application is incorporated herein by reference in its entirety as if set forth verbatim.

TECHNICAL FIELD

A cementitious composition related to three-dimensional printing

BACKGROUND OF THE INVENTION

The formation of workpiece using a three-dimensional printing method receives great popularity nowadays. The formation process or the material used can be varied. Most of them are based on similar principle, i.e. the workpiece is formed layer-by-layer until it is completed. This formation is controlled by a computer so that its design can be customized. One of the most widely used formation methods using a three-dimensional printer is the extrusion printing, which is also known as Fuse Deposition Material (FDM). It is low-cost and widely used compared with other methods. The basis of this extrusion printing method is to extrude the material used for the formation through a nozzle, which will move along the shape of the designed pathway in each layer until the workpiece is completed. Various materials can be used in this three-dimensional extrusion printing method, such as plastic, ceramic and metal. However, since the workpiece formation carried out by the three-dimensional printing method using plastic or metal material is costly and has low resistance to the environment, there is an effort to make use of lower-priced materials with better weather resistance in the three-dimensional printing formation. Therefore, the use of cementitious material which is widely used and highly environmental-resistant has begun. In using the cementitious material for the three-dimensional extrusion printing, the cement is mixed with water and other materials to obtain cement paste or mortar as a material for the extrusion printing. Nevertheless, there remains a problem in using the cementitious material in the three-dimensional printing formation which is the inconsistency in the printed line, resulting in poor appearance of the workpiece and the inaccurate dimension of the injected line and final workpiece. Although the problem with the dimension can be solved by reducing the amount of mortar, this solution causes a discontinuity of the printed line. Also, the workpiece surface is not thoroughly filled with the material. Therefore, the printed workpiece is inconsistent in quality, lacks homogeneity and has reduced strength.

Examples of the usage of cementitious material in the three-dimensional extrusion printing for obtaining good printing quality are as follows:

Patent publication no. WO2017221058A1 entitled "Online Control of Rheology of Building Material for 3D Printing", which was published in 2017, discloses a method for forming cement mortar using the three-dimensional extrusion printing. The object of this invention is to develop an ultra-high performance concrete construction material with flowability that suits the formation method, i.e. different types of hydraulic binder, aggregate, supplementary cementitious material, and mineral and chemical additive are used and, when mixed with water in a ratio of water per binding material by weight, gives a fresh concrete yield stress in a range of 600 to 4,000 pascal, which is a dynamic value, or, in other words, they are stress values of a moving cementitious material which is still not enough to give the cement or mortar coming out of the nozzle a sufficient stability. The present invention has thus developed a cementitious material by adding a cement additive which is quicklime or calcium sulfoaluminate cement to enhance the static yield stress property, i.e. a property of a material in a still condition which, in this place, is the property of the paste or mortar injected from the nozzle. If the static yield stress is high, the cement paste or mortar obtained will be highly stable. The resulting printed workpiece will contain fewer errors and is easier to use.

The invention according to Chinese patent publication no. CN104891891A of Tongji University entitled "3D Printing Cement-based Material and Preparation Method Thereof" is related to a cementitious material for the three-dimensional printing and preparation method which contains cement, additive, fine aggregate, water reducer, hydration accelerator, thickener, air entrainer, fiber, early compressive strength accelerator, copolymer, water repellent, as well as ettringite cement expansive additive or calcium oxide in dry powder form in a ratio of 100-part cement per cement expansion producing admixture of 0.01 to 5 percent or 0.0033 to 1.66 percent by weight of dry mortar powder. The coagulation accelerator serves to accelerate the solidification. When mixed with water, it can be used as concrete and mortar for forming a workpiece. The accelerator in CN104891891A is a chemical admixture pertaining to the sodium and calcium groups which is not quite effective in stabilizing the material in an early stage of the reaction or increases the dynamic yield stress. The cement paste or mortar therefore cannot be injected from the nozzle.

It can be seen that the previous inventions cannot provide good stability to the substance of the cementitious material coming out of the nozzle and are not convenient to use. In other words, the cementitious material has a constant dynamic yield stress, while the static yield stress is increased. Therefore, the purpose of the present invention is to develop a cementitious composition suitable for formation by three-dimensional printing having a stable cementitious material to provide convenience in designing and to obtain the desired workpiece dimension and a more effective three-dimensional printing formation process with the use of cementitious material.

SUMMARY OF THE INVENTION

The present invention is aimed at developing a cementitious composition suitable for formation by three-dimensional printing which gives the material extruded from a nozzle good stability. The workpiece from the three-dimensional printing formation therefore has fewer error and greater fineness and is easier to use due to the use of a cementitious composition comprising cement, fine aggregate, powdered limestone, expanding admixture, retarding admixture, thickener and rheology modifier.

In one example, a cementitious composition suitable for formation by three-dimensional printing is disclosed and includes a. cement 20-30% by weight of dry binding material; b. fine aggregate 50-70% by weight of dry binding material; c. powdered limestone 2-20% by weight of dry binding material; d. expanding admixture 0.1-5% by weight of dry binding material; e. retarding admixture 0.1-1.5% by weight of dry binding material; f thickener 0.1-2.0% by weight of dry binding material; g. rheology modifier 0.1-4% by weight of dry binding material, characterized in that the powdered limestone has an average fineness between 6,000-13,000 square centimeters per gram, and when the cementitious composition suitable for formation by three-dimensional printing is mixed with an appropriate amount of water, its flowability is between 55 and 80 centimeters, resulting in a mini slump between 75 and 100 millimeters.

In one example, the cement is selected from at least one or more of Portland cement, blended cement or alumina cement, with an average surface area of the cement between 2,700 and 5,600 square centimeters per gram.

In one example, the fine aggregate is selected from ground limestone, sand, recycled aggregate or a cement-inactive inert particle.

In one example, the fine aggregate with an average particle size greater than 600 microns is present in an amount less than 10% and a fineness modulus of the fine aggregate is between 2.3-5.5.

In one example, the expanding admixture is selected from a group consisting of calcium oxide or calcium sulfoaluminate cement, with an average surface area of the expanding admixture between 4,000 and 7,000 square centimeters per gram.

In one example, the retarding admixture is selected from a group consisting of sodium silico fluoride, sucrose or compound functional group of gluconate.

In one example, the thickener is selected from a group consisting of cellulose or starch ether.

In one example, the rheology modifier is selected from a group consisting of naphthalene, melamine or polycarboxylate.

In one example, the cementitious composition suitable for formation by three-dimensional printing contains any one of or both natural clay or synthetic clay as a component, the natural clay or synthetic clay is present in an amount between 0-5% by weight of dry binding material.

In one example, the cementitious composition suitable for formation by three-dimensional printing contains redispersible powder made of acetate, acrylic, vinyl acetate, epoxy or ethylene vinyl acetate between 0-5% by weight of dry binding material.

In one example, the cementitious composition suitable for formation by three-dimensional printing contains any one of or a combination of natural fiber, synthetic fiber and metallic fiber as a component, each fiber type is present in an amount between 0-5.4% by weight of dry binding material.

In one example, when mixed with water in a weight ratio of cementitious composition:water between 1:0.018-1:0.060, a mini slump is between 75 and 105 millimeters.

DETAILED DESCRIPTION

A cementitious composition suitable for formation by three-dimensional printing according to the present invention comprises:

| | | |
|---|---|---|
| cement | 20-30% | by weight of dry binding material |
| fine aggregate | 50-70% | by weight of dry binding material |
| powdered limestone | 2-20% | by weight of dry binding material |
| expanding admixture | 0.1-5% | by weight of dry binding material |
| retarding admixture | 0.1-1.5% | by weight of dry binding material |
| thickener | 0.1-2% | by weight of dry binding material |
| rheology modifier | 0.1-4% | by weight of dry binding material. |

"By weight of dry binding material" means the weight of the portions that are binding material, namely cement, fine aggregate and powdered limestone. The binding material containing supplementary cementitious materials such as fly ash, bottom ash, rice husk ash, volcanic ash, fine crushed stone, blast furnace slag, aluminium blast furnace slag or silica fume are also considered the dry binding material. According to the preparation of the cementitious composition of the present invention, the dry binding material is mixed with fresh cement modifying agents, namely expanding admixture, retarding admixture, thickener and rheology modifier. Admixtures which are minerals and chemical additives commonly used in the cement industry to adjust other properties can also be added.

The fine aggregate with an average particle size greater than 600 microns is present in an amount less than 10% and the fineness modulus is between 2.3-5.5, resulting in suitable flowability of the mortar for the three-dimensional printing formation. The surface of the mortar is smooth, not rough or cracked. This improves compressive strength and increases a long-term resistance, especially in terms of the drying shrinkage.

The powdered limestone used in the invented mortar for the three-dimensional printing formation has an average fineness between 7,000-13,000 square centimeters per gram. In Experiment 1, the average fineness used of approximately 11,000 square centimeters per gram gives the substance of the cementitious composition suitable flowability and good formability, optimizes the dynamic yield stress property, accelerates the hydration reaction of the cement in an early stage by accelerating the nucleation reaction to form portlandite, and strengthens the interfacial transition zone between the fine aggregate and the cement, as the calcium ion dissolved from the powdered limestone in a strong base condition of the cement paste can cause a hydration reaction in the interfacial transition zone.

Figure 2:
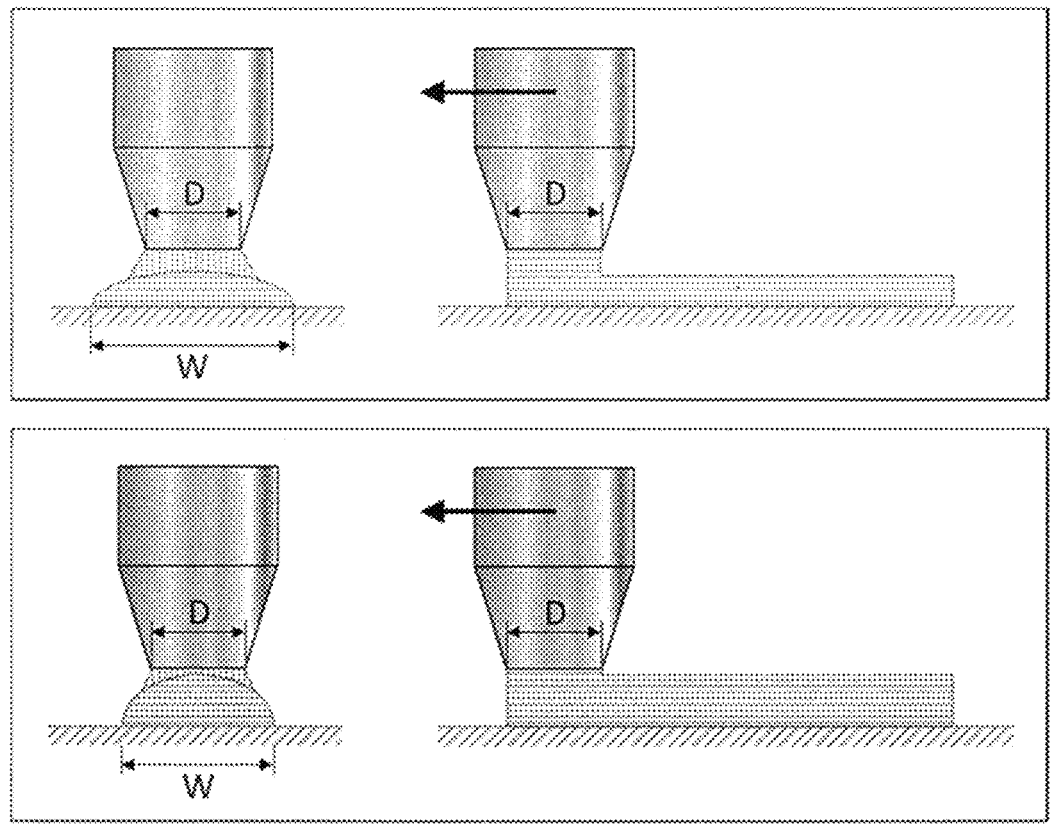
FIG. 2 is a process for forming a workpiece using the cementitious composition with different W/D values.

According to this study, the width of the line formed by the three-dimensional printing method which provides convenience in designing should not exceed 2 times the dimension of the nozzle size of the printer (W/D as in FIG. 2). Therefore, in order to achieve such property, the substance of the mortar obtained from the printing needs to be controlled so that it has good stability. The static yield stress is controlled to make it appropriate. Since it is difficult to measure the static yield stress of a mortar material directly, the mini slump is used instead in the test.

Figure 1:
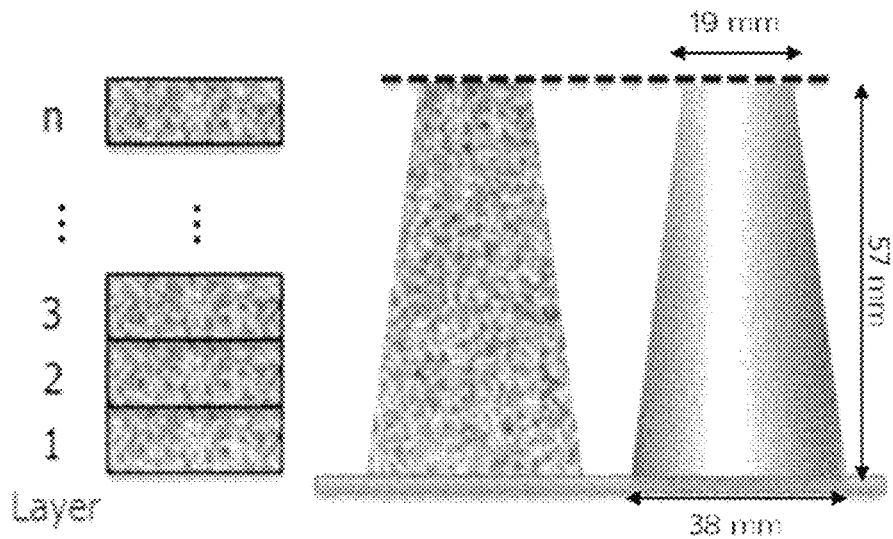
FIG. 1 shows a test for determining a mini slump which is modified from the ASTM C143/C143M standard.

The preferred property of the mortar for the three-dimensional printing formation using the extrusion printing method which makes the substance of cement paste and mortar become extrudable through the nozzle should have a flowability of the fresh mortar (as measured according to the ASTM C1437/C1437M which is modified to suit the three-dimensional mortar with only 10-time tapping) between 60-62 centimeters. From the results of Experiment 1, it can be seen that the mini slump is between 75 and 100 millimeters (as measured according to the ASTM C143/C143M, modified to suit the three-dimensional mortar according to the study of Tan Z; Bernal S A; Provis J L, 2017: Reproducible mini-slump test procedure for measuring the yield stress of cementitious pastes). The mini slump test has the same model of equipment used in the concrete slump test to make it suitable for testing the fresh mortar, except that the cone used is smaller and made of metal or plastic material according to FIG. 1. The test results from the formulae with cement expanding admixtures provide the width of the line relative to the dimension of the nozzle size (W/D) of less than 2. The different W/D values are shown in FIG. 2.

Experiment 1

Experiment 1 shows a study result on a suitable mini slump which make the W/D value less than 2. Each sample has the same or similar flowability.

| | Composition (% by weight) | | | | | | |
|---|---|---|---|---|---|---|---|
| Formula | Cement | Fine aggregate | Powdered limestone | Calcium sulfoaluminate-based expanding admixture | Quicklime-based expanding admixture | Combined fresh properties modified agent | Total (%) |
| 1 | 27 | 56 | 17 | 0 | 0 | 0.19 | 100.19 |
| 2 | 27 | 56 | 17 | 1 | 0 | 0.19 | 101.19 |
| 3 | 27 | 56 | 17 | 3 | 0 | 0.19 | 103.19 |
| 4 | 27 | 56 | 17 | 0 | 1 | 0.19 | 101.19 |
| 5 | 27 | 56 | 17 | 0 | 3 | 0.19 | 103.19 |
| 6 | 27 | 56 | 17 | 0 | 0 | 0.21 | 100.21 |
| 7 | 30 | 54 | 16 | 0 | 0 | 0.21 | 100.21 |
| 8 | 30 | 68 | 2 | 0 | 0 | 0.21 | 100.21 |
| 9 | 27 | 71 | 2 | 3 | 0 | 0.21 | 103.21 |
| 10 | 27 | 66 | 7 | 3 | 0 | 0.21 | 103.21 |
| 11 | 27 | 61 | 12 | 3 | 0 | 0.21 | 103.21 |

| Formula | Flowability (centimeter) | Mini slump value (millimeter) | W/D | Compressive strength of 1-day mortar (megapascal) | Compressive strength of 7-day mortar (megapascal) |
|---|---|---|---|---|---|
| 1 | 62 | 110 | 2.2 | 18.1 ± 0.1 | 36.2 ± 1.1 |
| 2 | 61 | 105 | 2.0 | 18.6 ± 2.0 | 40.5 ± 0.4 |
| 3 | 61 | 105 | 2.0 | 17.9 ± 0.2 | 41.1 ± 0.9 |
| 4 | 62 | 100 | 1.9 | 18.4 ± 0.3 | 38.5 ± 0.8 |
| 5 | 60 | 80 | 1.8 | 17.7 ± 0.7 | 39.7 ± 0.1 |
| 6 | 62 | 112 | 2.3 | 12.8 ± 0.5 | 32.9 ± 1.0 |
| 7 | 64 | 115 | 2.5 | 43.1 ± 0.6 | 62.3 ± 1.2 |
| 8 | 56 | 68 | | Not formable | |
| 9 | 60 | 70 | | Not formable | |
| 10 | 62 | 85 | 1.8 | 17.5 ± 1.4 | 40.3 ± 2.1 |
| 11 | 60 | 93 | 1.9 | 16.9 ± 0.1 | 38.1 ± 0.5 |

From the test result showing the mini slump of the fresh mortar for the three-dimensional printing which was combined with quicklime-based and calcium sulfoaluminate-based expanding admixtures at 1 percent and 3 percent per weight of dry binding material, respectively, it is found that an increase in the cement expanding admixture results in a decrease in mini slump value. The decreased mini slump value reflects the higher resistance to the static yield stress. The best value is the case where the calcium sulfoaluminate-based expanding admixture was added in a ratio of 3 percent per weight of the dry cement mortar, which results in a decrease of the slump from 110 to 80 millimeters, an improvement of 27.3 percent. However, when forming a sample according to the mortar formula 8, the flowability was lower than 56 centimeters and the substance of the mortar was rough, separated and not formable with the use of three-dimensional extrusion printer. Also, when forming a sample according to the mortar formula 9 using only 2 percent of powdered limestone per weight of the dry cement mortar, it is found that the flowability was suitable and the slump was 70 centimeters. However, the substance of the fresh mortar could not be used.

When forming a workpiece with the mortar cement for the three-dimensional printing by a three-dimensional extrusion printer to form a workpiece with a diameter of 1.8 meters and height of 2.0 meters using a nozzle with a diameter of 3 centimeters and the same control parameters for the machine, the test result shows that the ratio of W/D of the extruded line when using the mortar cement formula 5 (the formula with an addition of calcium sulfoaluminate-based expanding admixture) in a ratio of 3 percent per weight of the dry cement mortar was decreased from 2.2 to 1.8, a decrease of 18.2 percent approximately. The lower ratio gives accuracy and better sharpness to the workpiece formed by an injection. Two advantages for the three-dimensional material for designers are: 1) increased fineness and accuracy of the formed workpiece, and 2) the problem wherein the designer cannot form the workpiece that corresponds to the design because the workpiece flows laterally more than 2 times of the line or the predetermined size of the nozzle is eliminated.

From the study of the compressive strength value (as measured according to the ASTM C109/C109M standard) of the mortar for the three-dimensional printing with and without calcium sulfoaluminate-based expanding admixture (comparing formula 1 with formula 5) in a ratio of 3 percent per weight of the dry cement mortar, it is found that the values were similar.

What is claimed is:

1. A cementitious composition suitable for formation by three-dimensional printing comprising
   a. cement 20-30% by weight of dry binding material
   b. a fine aggregate 50-70% by weight of dry binding material
   c. powdered limestone 2-20% by weight of dry binding material
   d. expanding admixture 0.1-5% by weight of dry binding material
   e. retarding admixture 0.1-1.5% by weight of dry binding material
   f. thickener 0.1-2.0% by weight of dry binding material
   g. rheology modifier different from the thickener 0.1-4% by weight of dry binding material
   characterized in that the powdered limestone has an average fineness between 6,000-12,000 square centimeters per gram, and when the cementitious composition suitable for formation by three-dimensional printing is mixed with an appropriate amount of water, its flowability is between 60 and 70 centimeters, resulting in a mini slump between 75 and 100 millimeters.

2. The cementitious composition suitable for formation by three-dimensional printing according to claim 1, wherein the cement is selected from at least one or more of Portland cement, blended cement or alumina cement, with an average surface area of the cement between 2,700 and 5,600 square centimeters per gram.

3. The cementitious composition suitable for formation by three-dimensional printing according to claim 1, wherein the fine aggregate is selected from ground limestone, sand, recycled aggregate or a cement inert particle.

4. The cementitious composition suitable for formation by three-dimensional printing according to claim 1, wherein the fine aggregate comprises an average particle size greater than 600 microns and is present in an amount less than 10% and comprises a fineness modulus of the fine aggregate is between 2.3-5.5.

5. The cementitious composition suitable for formation by three-dimensional printing according to claim 1, wherein the expanding admixture comprises calcium oxide, with an average surface area of the expanding admixture between 4,000 and 7,000 square centimeters per gram.

6. The cementitious composition suitable for formation by three-dimensional printing according to claim 1, wherein the retarding admixture is selected from a group consisting of sodium silico fluoride or sucrose.

7. The cementitious composition suitable for formation by three-dimensional printing according to claim 1, wherein the thickener is selected from a group consisting of cellulose or starch ether.

8. The cementitious composition suitable for formation by three-dimensional printing according to claim 1, wherein the rheology modifier is selected from a group consisting of naphthalene, melamine or polycarboxylate.

9. The cementitious composition suitable for formation by three-dimensional printing according to claim 1, wherein the cementitious composition suitable for formation by three-dimensional printing contains any one of or both natural clay or synthetic clay as a component, the natural clay or synthetic clay is present in an amount between 0-5% by weight of dry binding material.

10. The cementitious composition suitable for formation by three-dimensional printing according to claim 1, wherein the cementitious composition suitable for formation by three-dimensional printing contains redispersible powder made of acetate, acrylic, vinyl acetate, epoxy or ethylene vinyl acetate between 0-5% by weight of dry binding material.

11. The cementitious composition suitable for formation by three-dimensional printing according to claim 1, wherein the cementitious composition suitable for formation by three-dimensional printing contains any one of or a combination of natural fiber, synthetic fiber and metallic fiber as a component, each fiber type is present in an amount between 0-5.4% by weight of dry binding material.

12. A cementitious composition suitable for formation by three-dimensional printing comprising

| | | |
|---|---|---|
| a. cement | 20-30% | by weight of dry binding material |
| b. a fine aggregate | 50-70% | by weight of dry binding material |
| c. powdered limestone | 2-20% | by weight of dry binding material |
| d. expanding admixture | 0.1-5% | by weight of dry binding material |
| e. retarding admixture | 0.1-1.5% | by weight of dry binding material |
| f. thickener | 0.1-2.0% | by weight of dry binding material |
| g. rheology modifier different from the thickener | 0.1-4% | by weight of dry binding material | characterized in that the powdered limestone has an average fineness between 6,000 to 12,000 square centimeters per gram, and when the cementitious composition suitable for formation by three-dimensional printing is mixed with an appropriate amount of water, its flowability is between 60 and 64 centimeters, resulting in a mini slump between 75 and 105 millimeters wherein, when the composition is mixed with water, the composition comprises a weight ratio of cementitious composition to water between 1:0.018-1:0.060.

\* \* \* \* \*